Nov. 2, 1943.     K. W. DU BOIS     2,333,415
FLUID CONTROL APPARATUS
Filed Feb. 10, 1940
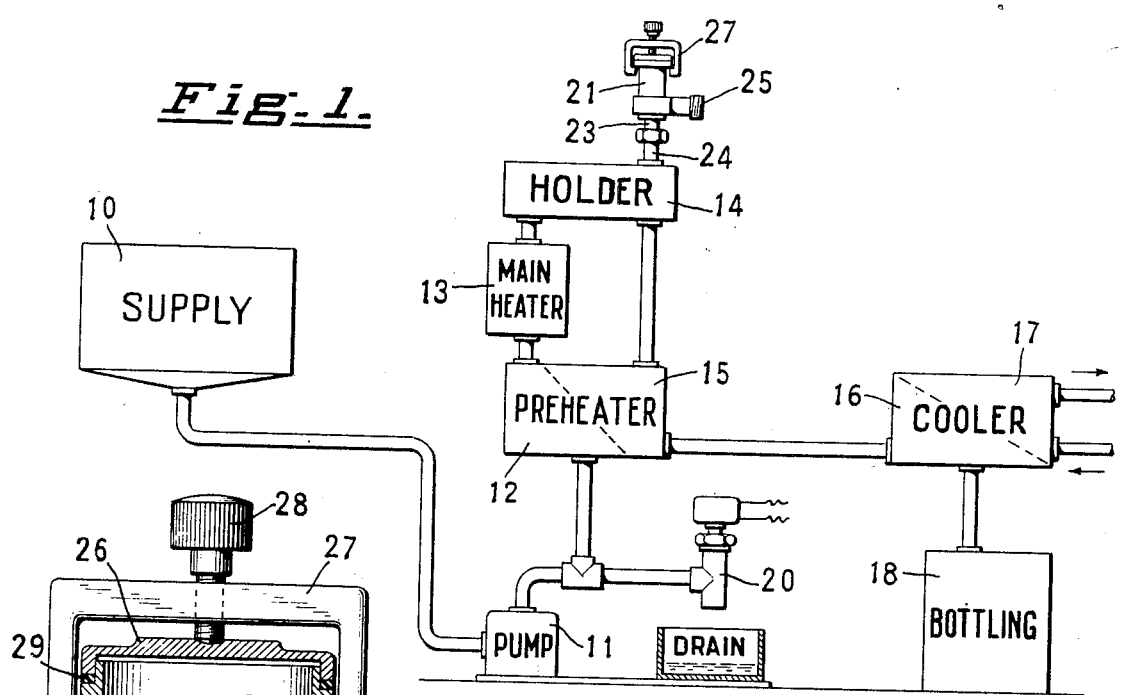
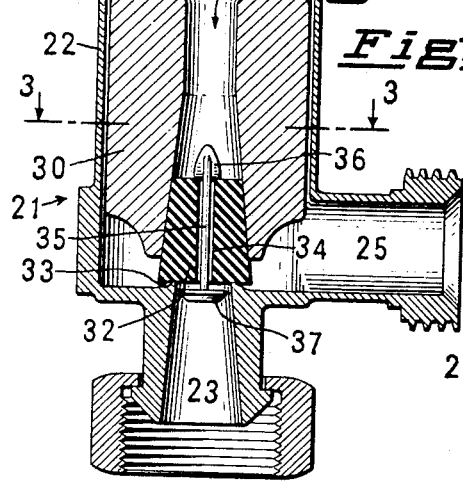
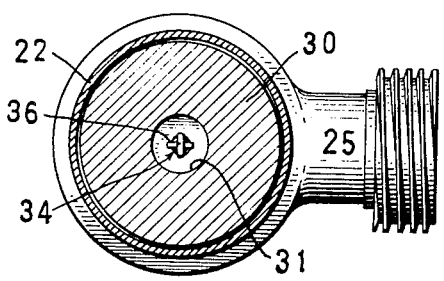
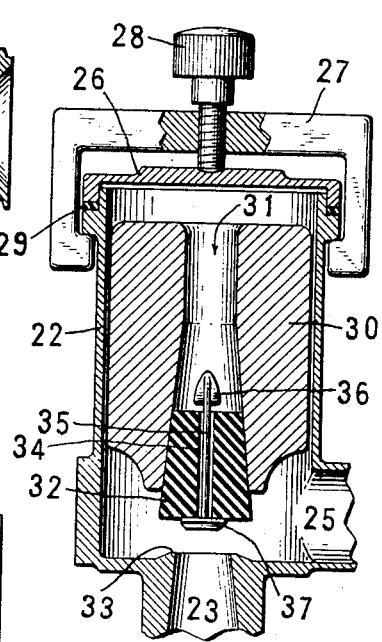
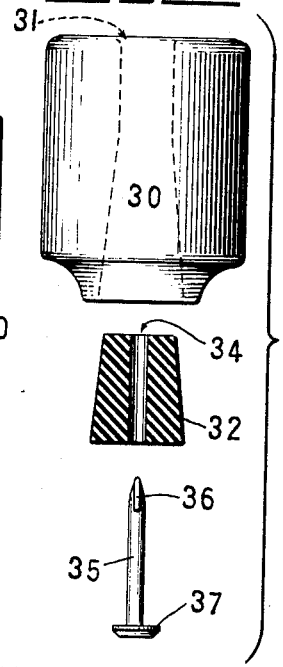
INVENTOR
KENNETH W. DU BOIS,
BY
ATTORNEY Patented Nov. 2, 1943

2,333,415

UNITED STATES PATENT OFFICE 2,333,415

FLUID CONTROL APPARATUS

Kenneth W. Du Bois, Plainville, Conn., assignor to The Trumbull Electric Manufacturing Company, Plainville, Conn., a corporation of Connecticut Application February 10, 1940, Serial No. 318,254

5 Claims. (Cl. 277—45)

My invention relates to a valve to be used in systems for handling liquids and especially for pasteurization. Such systems involve the automatic movement of liquid and the control of temperature within narrow limits. Under some circumstances it becomes necessary to drain the system and under other circumstances the system may become clogged or frozen.

The Getchell Patent 2,052,396 shows such a system for treating milk in which the milk is pumped sequentially through a regenerative pre-heater or heat-exchanger, then through a chamber where it is heated by the passage of an alternating electric current through the flowing milk, then back through the heat exchanger to a cooler and hence to a point of delivery such as a bottling machine. It has been found highly desirable to vent such a system for drainage in case the pump stops or the pressure falls below a desired minimum and to relieve the pressure in case it goes above a safe limit. Both of these features are desirable in systems using an open type of regenerator and even more important in systems employing the closed type of plate regenerator and cooler which is more likely to get clogged by freezing and might be seriously damaged by the excessive pressure caused by the stoppage.

I have accordingly devised a special type of valve to be located preferably at the highest point in the system or at least at a higher level than the discharge or drain valve in such systems as shown in the Frederickson Patent 2,143,346. This makes it possible to discharge milk from the system (even if otherwise closed) in the event of a stoppage of the supply pump. In case the system becomes clogged by freezing or otherwise, the same valve is opened to allow the escape of the milk to a convenient receptacle and the setting of an alarm by the valve or by the milk if desired.

Such a valve may also be utilized in a system such as shown in the Rudd Patent 1,730,016 in conjunction with a so-called thermodynamic control valve and in place of the overflow outlets of that patent.

Fig. 1 is a diagrammatic view of one form of system with a valve embodying my invention as applied to the pasteurization of milk according to the Getchell Patent 2,052,396 and the Frederickson Patent 2,143,346.

Fig. 2 is a vertical sectional view of the special valve device for use in such a system and showing the valve closed to the passage of liquid but open to provide a vent.

Fig. 3 is a cross sectional view of the device of Fig. 2, on the line 3—3.

Fig. 4 is a view similar to Fig. 2 showing the valve open for the escape of liquid.

Fig. 5 is an exploded view of the movable parts of the valve device.

In the system shown in Fig. 1 the liquid is supplied from reservoir 10 and forced by a suitable pump 11 through the cold side 12 of the pre-heater, the main heating chamber 13, the holding chamber 14, back through the hot side 15 of the regenerator, through the warm side 16 of the cooler where it is chilled by the brine or other cooling liquid in the part 17, and thence to the bottling machine 18 or other point of delivery. The pre-heater or regenerator may be of any suitable construction such as the coil or plate type and the cooler may similarly be of any suitable construction such as the coil or plate type. The main heater 13 may be of any suitable type but is preferably of the electric type of the Getchell patent. The holding chamber 14 may also be of any suitable type such as a reservoir or a long coil or series of plate chambers in order to retain the liquid at the desired temperature for the desired period of time before it is discharged to the hot side of the pre-heater. Such a system also preferably has a discharge valve 20 as set forth in the Frederickson patent in order to remove from the system any improperly heated liquid or in case the pump stops.

The valve 21 is preferably located at the top of the system and has an outer cylinder, casing or body 22 with a nipple 23 for attachment to a suitable outlet such as 24. The outlet 25 is open and may lead to any suitable receptacle for liquid or back to the source of supply. The top 26 is secured in such a manner as to permit ready detachment as for instance by a clamp 27 and screw 28. A gasket 29 is desirable to afford a tight joint which produces an air or fluid cushion above the movable parts of the valve, acting as a buffer to the upward or downward movement of the valve 30. Inside the cylinder is a heavy valve member 30 movable up and down in the cylinder but spaced apart from the inner wall to allow for the passage of air from the air inlet 23, around the outside of member 30 and through the center of the member 30 to the system. The valve member 30 however preferably fits rather closely in the cylinder leaving only a small passage between the sides of the member 30 and the adjacent inner wall of the casing cylinder so as to maintain the air or fluid cushion effect and prevent hammering when the pressure in the system reaches a point at which the valve member 30 is about to be lifted from its seat. The center of the member 30 has a passage 31, which may be tapered and which is closed by a relatively soft resilient rubber plug 32 adapted to rest on the seat 33. The bottom of the member 30 may also be tapered around the outside of its lower end to allow for the escape of liquid when the valve is raised. The plug 32 also has a passage 34 in which is located a smaller flat valve stem 35 having a pointed "arrow-head" tip 36 above and a valve 37 below. The stem 35 does not close the passage 34. The pointed tip permits the valve 37 and its stem to be readily inserted into the plug from below but prevents accidental withdrawal. The head 37 is small enough to drop into the upper end of the inlet 23. The valve and stem may be readily withdrawn by simply squeezing the plug so as to permit the tip to pass through.

In starting the system air is allowed to escape around the valve 37, through the passages 34 and 31, through the space between valve 30 and casing 22 and through the outlet 25. When in full operation the valve 37 is kept closed by the normal fluid pressure in the system, which pressure however is not great enough to lift the valve 30. In case the normal discharge end of the system, for instance the cooling section, is clogged or closed the pressure of course will build up and as soon as it is great enough it will raise the valve 30 and permit the liquid to escape from the outlet 25 thus avoiding any damage to the system. The air pocket in the top of the cylinder prevents hammering of the weight 30 in its movements up and down by producing a dampening or dash-pot effect.

In case the pump stops, pressure on the valve 37 falls, which permits the valve 37 to drop and thus permit air to enter through passage 25, around the outside of member 30, and down through passages 31, 34 and 23 so that the system can drain properly.

The parts of the combination valve are all mechanically simple, designed for easy assembly and disassembly, and made to facilitate cleaning.

I claim:

1. A valve structure of the character described comprising a casing having an inlet at the bottom and an outlet at one side, a gravity actuated plunger vertically movable in the casing and having a vertical passage, a resilient plug removably seated in the lower end of said plunger and having a vertical passage, a supplemental valve removably mounted in the plug and having a head at its lower end adapted to close the passage in the plug, said plug normally resting on the upper end of the inlet to said casing, said supplemental valve having an enlarged portion on its upper end adapted to be forced through the passage of said plug to removably retain said supplemental valve in said plug.

2. A valve structure of the character described comprising a casing having an inlet at the bottom and an outlet at one side, a gravity actuated plunger mounted in said casing and having a vertical passage, said plunger fitting rather snugly in the casing and leaving only a small air passage between the sides of the plunger and the adjacent inner wall of the casing, a closure for the upper inner end of said casing forming an air compression chamber at the upper end of the casing, a plug removably mounted in the lower end of said plunger and normally resting on the upper end of the inlet of said casing at least the lower part of the plug being resilient and a loosely mounted gravity actuated supplemental valve in said plug, said plug having a passage closed by said supplemental valve when a predetermined working fluid pressure is applied to said inlet and said supplemental valve opening said passage when said fluid pressure falls below a predetermined working pressure.

3. A combination valve comprising a casing having an inlet at one end and an outlet at one side thereof, a plunger means movable longitudinally in said casing tending to maintain said plunger at the inlet end of the casing, said plunger having a longitudinal passageway therethrough, a resilient plug removably seated in the end of said plunger adjacent said inlet and having a longitudinal passageway therethrough, an ancillary valve means removably mounted in the plug and having at the end thereof adjacent said inlet a head adapted to close the passage in the plug, said ancillary valve means being arranged to keep said plug passage open when the pressure on the head falls below a predetermined value, said ancillary valve means having at its upper end an enlarged portion adapted to be forced through the passage of said plug to removably retain said ancillary valve means in said plug.

4. A bypass valve for a liquid treating system, said valve having an elongated hollow casing closed at the top and having a first aperture for entrance of liquid at the bottom thereof and a second lateral aperture in one side and above the bottom thereof for the discharge of liquid, a main plunger of a cross-sectional shape corresponding at least in part to that of said casing and having a sliding fit within said casing, said casing having an air compression chamber above said plunger with an outlet only between the plunger and casing so that air can escape through said casing around the walls of said plunger, said plunger having extending vertically therethrough a substantially centrally located and relatively unobstructed main passageway, plug means seated in the bottom end of said main passageway and sealing said first aperture when said plunger is at the bottom of said casing, said plug means having extending vertically therethrough an ancillary passageway communicating with said main passageway and a secondary plunger operating in said ancillary passageway, a valve head on the bottom of said secondary plunger seating against and sealing the bottom of said ancillary passageway when a predetermined liquid pressure is applied to the lower face of the valve head and capable of dropping by gravity when the liquid pressure is reduced below a predetermined point so as to unseal said ancillary passageway, whereby pressure above a predetermined amount upon the lower face of said valve head and said plug means causes said valve and the main plunger to rise against gravity so as to permit liquid to flow through the casing from said entrance aperture to said discharge aperture and whereby subnormal working pressure below the main plunger allows said secondary plunger and valve head to fall by gravity and to permit air to enter the casing through the second aperture and flow between said main plunger and the casing wall, down said main passageway and out through said ancillary passageway and said first aperture.

5. In a valve structure, a casing having an inlet and an outlet, a plunger mounted to move in the casing and having a passage, a resilient plug removably mounted in said passage and itself having a passage, a valve for closing said plug passage and having a stem insertable through said plug passage and of smaller diameter than said plug passage, said stem having a small enlargement on its upper end insertable through the passage in the resilient plug, said enlargement being large enough to support the valve and its stem in the plug but so shaped as to leave an air passage when it rests on the upper face of the plug.

KENNETH W. DU BOIS.